May 6, 1958     F. J. NORDSIEK     2,834,002
HEIGHT CLEARANCE FEELER DEVICE

Filed Aug. 17, 1955     2 Sheets-Sheet 1

INVENTOR.
FREDRICK J. NORDSIEK
BY: Harold B. Hood
ATTORNEY

May 6, 1958 F. J. NORDSIEK 2,834,002
HEIGHT CLEARANCE FEELER DEVICE
Filed Aug. 17, 1955 2 Sheets-Sheet 2
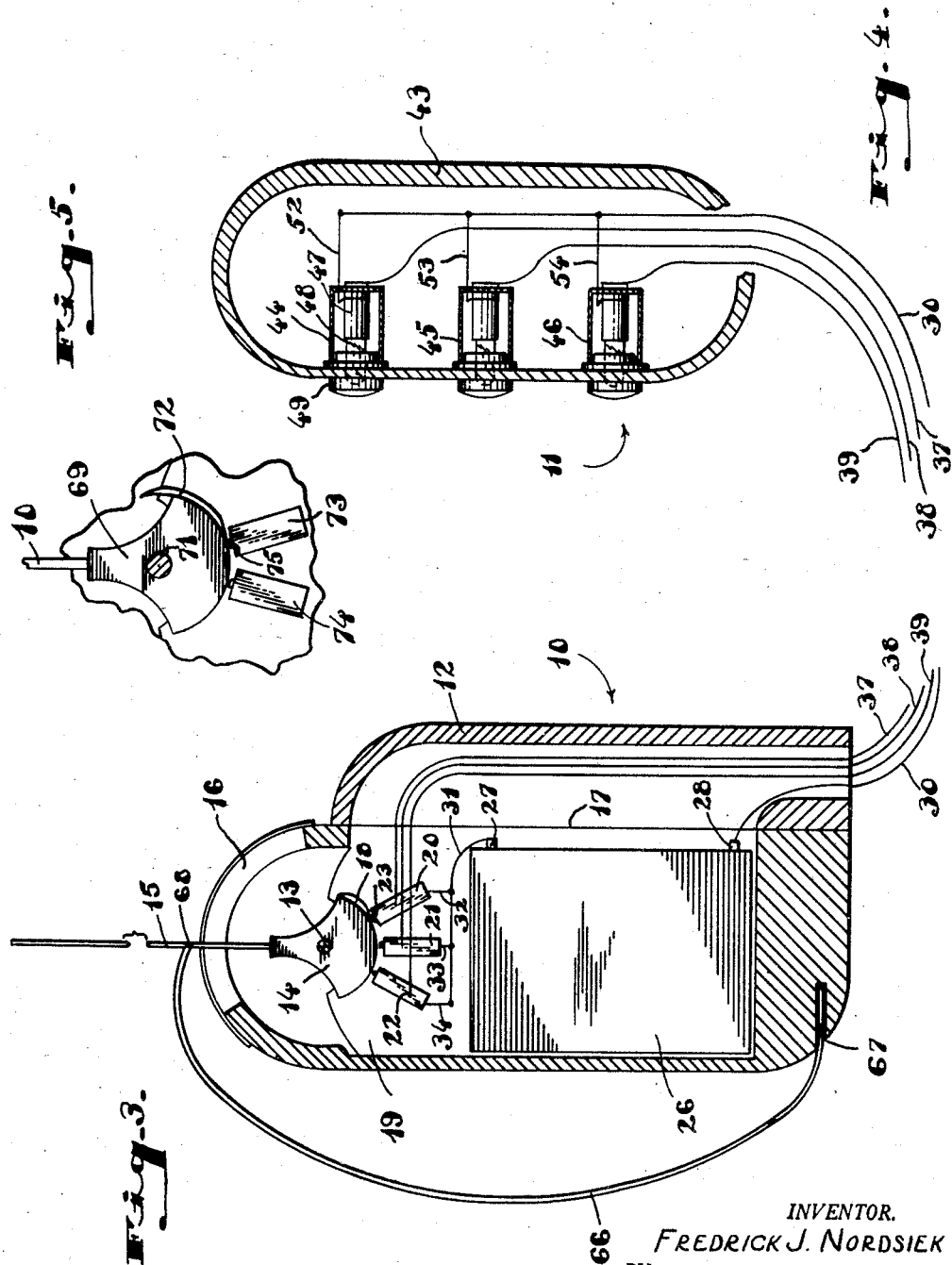
INVENTOR.
FREDRICK J. NORDSIEK
BY: Harold B. Hood
ATTORNEY

United States Patent Office 2,834,002
Patented May 6, 1958

2,834,002
HEIGHT CLEARANCE FEELER DEVICE

Fredrick James Nordsiek, Indianapolis, Ind.

Application August 17, 1955, Serial No. 528,978

1 Claim. (Cl. 340—61)

This invention relates to a clearance indicating device, and more particularly, to a device for indicating the relative clearance, or the lack of clearance, of a portion of a vehicle with respect to an impending obstruction.

As is well known among those engaged in the administration of trucking and other transportation businesses, a general feeling of apathy or indifference exists among operators of trailer trucks and other hauling vehicles toward the use of extra equipment on these vehicles and particularly toward such use as requires any substantial measure of effort. For the most part this attitude is unwarranted but continues to prevail. It follows that in providing a device of the type including my invention, it is highly advantageous that the device require a minimum of effort on the part of the driver or operator to adjust and operate.

Accordingly, a principal object of my invention is to provide a vehicle trailer or other rolling stock with a novel clearance indicating device which provides the above-mentioned advantages.

A further important object of this invention is to provide a novel clearence indicating device which is self-contained and/or which may be operatively mounted in toto on the trailer of a vehicle.

A further object of my invention is to provide a clearance indicating device which includes a plurality of mutually-distinguishable indicators, the indicators being effective to warn the operator of the vehicle on which it is installed of the relative clearance between the vehicle and an impending obstruction, as well as the lack of such clearance.

A further object of my invention is to provide a clearance indicating device having feeler means which can be conveniently adjusted to a position out of engagement with an obstruction to permit a vehicle to back up or move in a direction opposite to that by which it has approached an obstruction and brought the feeler means into engagement with the obstruction, thereby avoiding damage to the feeler means.

Further objects will become apparent as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 3 is an elevational view partly in section of one form of sensing unit embodying my improved clearance indicating device;

Fig. 4 is an elevational view partly in section showing the indicating unit thereof; and Fig. 5 is a slightly enlarged fragmentary view showing a portion of a modified form of sensing unit embodied within my invention.

Figure 1:
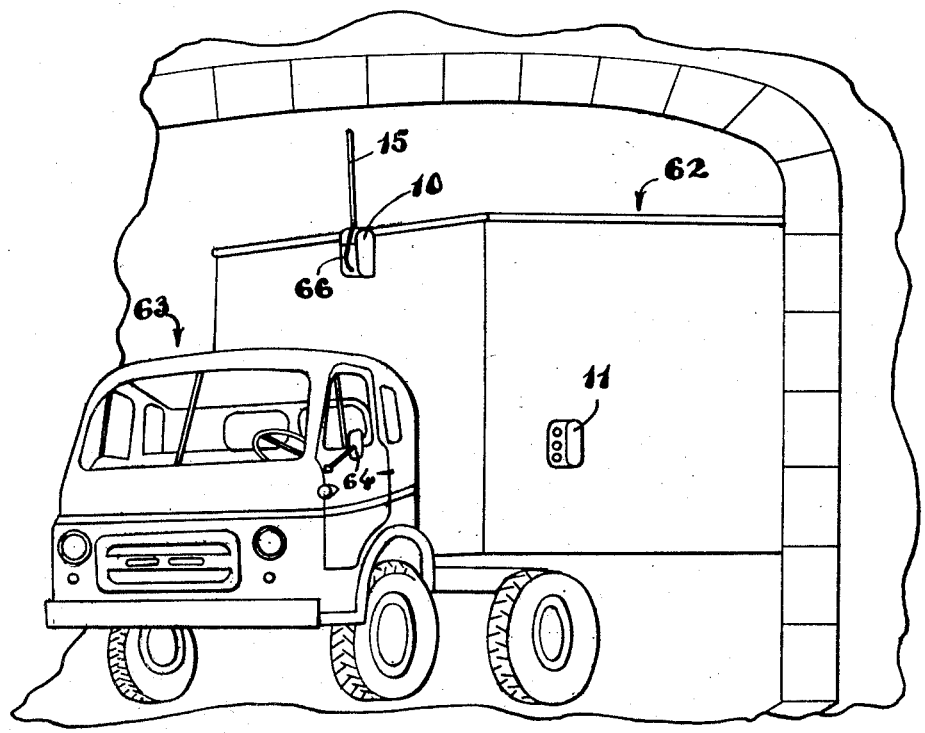
Fig. 1 is a perspective view of a tractor-trailer combination with my improved clearance indicating means mounted on the trailer thereof.

Referring to the drawing, my improved device includes a sensing unit 10 and an indicating unit 11. Referring particularly to Fig. 3, sensing unit 10 includes a housing 12 which may be formed in two parts and separable along a vertical plane indicated at 17. Disposed within housing 12 is a shaft 13, each end of which is supported by housing 12. Shaft 13 pivotally mounts member 14 for movement about the axis of shaft 13. Member 14 carries a normally-vertically disposed feeler member 15 which is yieldably biased to vertical position by means later to be described. Feeler member 15 is swingable through a slot 16 formed at the upper end of housing 12. Member 14 carries a cam 18 for movement therewith for a purpose soon to become apparent.

Relatively fixed within housing 12 is a frame member 19 which supports three normally open, electrical microswitches 20, 21 and 22, respectively. Each of switches 20, 21 and 22 includes an actuating means which may be in the form of a push-button 23 which is resiliently biased by any convenient means to open position. It is apparent that upon pivotal movement of feeler member 15 to the right as viewed in Fig. 3, cam 18, which is bevelled at each end, will come into contact with and successively depress the push-button of each of switches 20, 21 and 22. In the embodiment shown in Fig. 3, the length and conformation of cam 18 is such that in moving past the push-button of each switch, that push-button will be permitted to move to open position at substantially the same time that the next succeeding push-button is depressed to closed position.

A storage battery 26 or other source of electrical energy may be mounted within housing 12 as shown in Fig. 3. Battery 26 may be provided with the usual terminals 27 and 28. Alternatively, the device of the present invention may be externally energized, though I presently prefer to use the self-contained structure illustrated. One end of an electrical line 30 may be operatively connected with terminal 28. Another line 31 may be connected to terminal 27 and to each of lines 32, 33 and 34. Lines 32, 33 and 34 are connected to switches 20, 21 and 22, respectively. Extending from switches 20, 21 and 22 are leads 37, 38 and 39, respectively.

Referring to Fig. 4, the indicating unit 11 of my improved device is shown as comprising a housing 43 within which a plurality of mutually-distinguishable indicating devices 44, 45 and 46 are mounted. Each of these indicating devices includes a socket 47 within which a lamp bulb 48 is operatively disposed. When the lamp bulb 48 of each of these indicating devices is energized, a transparent or translucent cover or lens 49 juxtaposed with respect to that lamp becomes illuminated. Preferably the cover member 49 of each of the indicating devices is of a different color from that of the others; for instance, green for unit 44, amber for unit 45, and red for unit 46.

Housing 43 may be formed of two separable parts divided along a vertical plane in a manner somewhat similar to that of sensing unit 10 to provide convenient access to the interior thereof. Lines 37, 38 and 39 lead from sensing unit 10 into the interior of housing 43 of indicating unit 11 and connect with indicators 44, 45 and 46, respectively. Line 30 likewise leads from sensing unit 10 to the interior of housing 43 and is connected through each of lines 52, 53 and 54 to indicating devices 44, 45 and 46, respectively.

It will be clear that each of normally open switches 20, 21 and 22 is electrically connected through battery 26 in series relation with indicators 44, 45 and 46, respectively. Of course, each indicator-switch set is connected in parallel relation with each of the other switch-indicator pairs.

Figure 2:
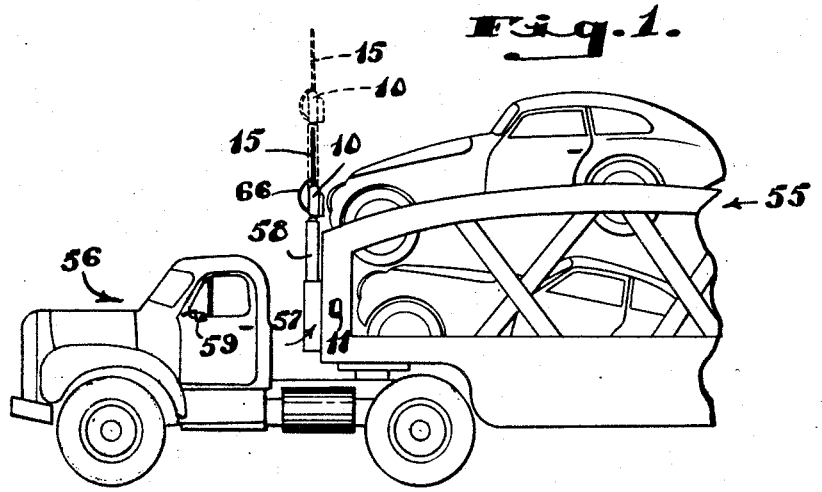
Fig. 2 is an elevational view of another form of tractor-trailer combination and showing my improved clearance indicating device mounted thereon, the sensing unit of my device being shown telescopically mounted on the trailer thereof.

In each of Figs. 1 and 2 I have shown my improved clearance indicating device mounted in operative relation with respect to a tractor-trailer combination. As shown in these figures, the clearance indicating device is preferably mounted in toto on the trailer of the combination as a self-contained unit. That is, it is not necessary for the operation of my improved clearance indicating device that any connection, physical or electrical, be provided between the tractor and my improved device. This being the case, it is clear that the tractor of the tractor-trailer combination may be separated from the trailer or replaced by a different tractor without disturbing the set-up, in operative position, of my improved clearance indicating device. Referring particularly to Fig. 2, sensing unit 10 of my improved device is shown as being mounted on a trailer 55 in vertically adjustable position by means of extensible bracket 57 which includes a telescopically adjustable member 58. The upper end of feeler member 15 is preferably disposed forwardly of the trailer and approximately one foot above the highest extremity of the trailer 55 or the load carried thereby, whichever is higher. Through vertically adjustable bracket 57, the vertical position of feeler member 15 may be conveniently adjusted to accommodate changes in height of the highest extremity of the trailer or its load. As is apparent from Fig. 2, indicating unit 11 of my improved device is mounted on trailer 55 in such a position that it is in full view of the driver or operator of tractor 56 through rear view mirror 59. Likewise, in Fig. 1 sensing unit 10 and indicating unit 11 are mounted on the trailer 62 of a tractor-trailer combination. In Fig. 1, feeler 15 is vertically adjustable with respect to trailer 62 (by means not shown), and indicating unit 11 is mounted on trailer 62 in full view of the operator of tractor 63 through rear view mirror 64. In the environment of Fig. 1, adjustability of the height of feeler 15 is not essential, though it may be desirable.

My improved clearance indicating device incsludes a novel means for yieldably biasing feeler member 15 toward vertical position, and this means will now be described in detail. A long slender member 66 which is formed of resilient material such as spring steel is operatively connected at one end to feeler member 15. By reference to Figs. 1 and 2, it will be apparent that member 66 is disposed forwardly of feeler member 15, and is connected to feeler member 15 at a location 68 spaced a short distance from the axis of shaft 13 about which feeler member 15 swings as compared with the over-all distance to which the feeler member projects from said axis. The opposite end of member 66 is removably seated in a socket 67 provided in housing 12 of sensing unit 10 at a location remote from location 68. It will be apparent that with this arrangement, engagement of member 66 with any obstruction lower than the top of housing 12 will rapidly and immediately swing feeler member 15 to the right as viewed in Fig. 3 to light lamps 44, 45 and 46 in rapid succession and leave lamp 46 lighted.

The operation of my improved device will now be described. If feeler member 15 should strike an obstruction, such as, for example, an overhanging portion of a trestle or other underpass, it will be swung in a clockwise direction about the axis of shaft 13 to a greater or lesser degree depending upon the height of the obstruction above sensing unit 10. If the feeler is swung slightly, the button of micro-switch 20 will be depressed by cam 18 to light lamp 44 and thus indicate to the operator that an obstruction requiring caution has been encountered, but that a substantial clearance between the top point of the trailer and the impending obstruction exists. An obstruction for which there is less clearance between the highest point on the trailer and the impending obstruction will swing feeler member 15 to a greater degree to depress the push-button on micro-switch 21 and thereby light lamp 45. If the height of the obstruction is so low as to swing the feeler 15 far enough to close switch 22 to light indicator 46, the operator will thereby be advised to proceed no farther. If the obstruction is disposed at or below the level of the uppermost portion of the trailer, it will be engaged by member 66 to throw feeler member 15 through its full range of movement to the right as viewed in Fig. 3, and thereby light indicating device 46 to indicate to the driver that he must make an emergency stop to avoid hitting the obstruction with the trailer. It is apparent then that feeler member 15 along with member 66 is effective throughout a range of pivotal movement of feeler 15 to energize each of indicating devices 44, 45 and 46 throughout a portion of the total range of pivotal movement of feeler 15. It is apparent too, that member 66 provides the double function of yieldably biasing feeler member 15 to vertical position and sensing the situation wherein substantial continued forward movement of the trailer with respect to the obstruction will result in engagement by the trailer with the obstruction.

The possibility exists, of course, that after entering a tunnel or other extended obstruction, feeler member 15 would be initially engaged to swing it to the right and then member 66 might be engaged by an obstruction under which sufficient clearance for the trailer would not be existent. In such a case, it can be seen that if the trailer should be backed out of the tunnel, the reaction force imposed by the roof of the tunnel against the distal end of feeler 15 would tend to bend or to have other damaging effect on the feeler 15. To avoid this possibility the lower end of spring member 66 can be removed from the socket 67 and member 15 caused to assume a position at which it is swung to the right to the limit determined by the right hand end of slot 16. With feeler member 15 so adjusted, its end wil be disengaged from the roof of the tunnel or underpass and the vehicle can be backed out from under the underpass without damage to the feeler.

The fragmentary view shown in Fig. 5 illustrates a modified portion of the sensing unit 10. In this embodiment a member 69 having a feeler member 70, and which is pivotal about the axis of a shaft 71, is provided. These parts are similar in shape and function to corresponding parts 14, 15 and 13, respectively, as shown in Fig. 3. A cam 72 is mounted for movement with member 69, but in this embodiment, the cam is of sufficient length that during movement of cam 72 to the left as viewed in Fig. 5, the push-button 75 of micro-switch 73 will be initially depressed, then the push-button of micro-switch 74 will be depressed along with depression of the push-button of micro-switch 73, and then further movement of cam 72 to the left will be effective to continue depression of the push-button of micro switch 74 after the push-button of micro-switch 73 is released. Each of micro-switches 73 and 74 of this embodiment would be connected to a respective lamp in the same manner as that shown in Figs. 3 and 4. However, rather than three lamps being illuminated in succession during the gradual approach toward an impending obstruction as would be the case with the modification shown in Figs. 3 and 4, with the modification shown in Fig. 5 one of the lamps would first be illuminated, while it remains illuminated the second lamp would become illuminated and finally the second lamp would remain illuminated after the first lamp was extinguished. It will be apparent then that so long as a plurality of indicating devices are provided which are energized in the appropriate sequence, the relative clearance between the vehicle and an impending obstruction can be readily determined by the operator of the vehicle, as well as the lack of such clearance. This is in contradistinction to conventional clearance indicating devices which merely warn that no clearance is available.

The sensing unit 10 is preferably mounted so that the feeler member 15 is disposed a significant distance forwardly of the uppermost portion of the trailer, and the driver or operator of the tractor pulling the subject trailer is thereby given adequate information to determine the relative clearance between the truck and an impending obstruction to thereby avoid striking the obstruction with the trailer. Since the entire device including the sensing unit 10 and indicating unit 11 is preferably mounted in toto on the trailer, the tractor with which the trailer is associated may be removed and/or replaced with another without disturbing the operative relation between the two units. This highly beneficial result prevails, too, since, as shown in the illustrated embodiments, the battery 26 or other source of electrical energy is preferably self-contained within the sensing unit as part of the clearance indicator unit.

Although my invention has been illustrated and described as associated with a tractor-trailer combination, it will be clear that its use is not necessarily limited thereto.

I claim as my invention:

A device of the class described comprising frame means adapted to be secured to a vehicle, cam means supported from said frame means to swing about an axis transverse to the direction of travel of said vehicle, a plurality of normally open switches, each having an element movable to close the associated switch, said switches being supported from said frame means with said elements positioned for sequential engagement by said cam means, a plurality of signal devices, means for mounting said signal devices on said vehicle, a source of electrical energy supported from said frame means and connected, through said respective switches, to energize said respective signal devices, feeler means mounted to move with said cam means and projecting upwardly beyond said frame means, and a stiffly resilient spring having one end anchored on said feeler means closely adjacent said cam means, extending downwardly, in forwardly-bowed formation, ahead of and outside said frame means, and having its lower end removably received in a socket formed in the forward face of said frame means.

References Cited in the file of this patent

UNITED STATES PATENTS

| | | |
|---|---|---|
| 2,214,685 | Stone | Sept. 10, 1940 |
| 2,259,614 | Chang | Oct. 21, 1941 |
| 2,440,587 | Krall | Apr. 27, 1948 |
| 2,554,371 | Marx | May 22, 1951 |

FOREIGN PATENTS

| | | |
|---|---|---|
| 494,424 | Great Britain | Oct. 26, 1938 |